United States Patent Office 3,715,374
Patented Feb. 6, 1973

3,715,374
24,25-DIHYDROXYCHOLECALCIFEROL
Hector F. De Luca, Madison, Wis., assignor to the Wisconsin Alumni Research Foundation, Madison, Wis.
No Drawing. Continuation-in-part of application Ser. No. 157,020, June 25, 1971. This application May 5, 1972, Ser. No. 250,661
Int. Cl. C07c 171/10
U.S. Cl. 260—397.2
1 Claim

ABSTRACT OF THE DISCLOSURE 24,25-dihydroxycholecalciferol and methods for preparing same. 24,25-dihydroxycholecalciferol is characterized by antirachitic activity and by its ability to induce bone mobilization.

---

The invention described herein was made in the course of, or under, a grant from the U.S. Public Health Service, Department of Health, Education, and Welfare.

This application is a continuation-in-part of application Ser. No. 157,020, filed June 25, 1971 and entitled 21,25-Dihydroxycholecalciferol.

Various derivatives of vitamin D have been discovered during the last several years, e.g. 25-hydroxycholecalciferol and 25-hydroxyergocalciferol (U.S. Letters Patent Nos. 3,565,924 and 3,585,221 respectively). Evidence indicates that these compounds are biologically active metabolites of vitamin $D_3$ and vitamin $D_2$ and additional evidence points to 25-hydroxycholecalciferol as being the circulating active form of vitamin $D_3$ in the blood.

A compound, which has now been identified as 24,25-dihydroxycholecalciferol, has been found and is believed to be a further metabolite of 25-hydroxycholecalciferol. This compound is characterized by some antirachitic activity, an effect upon intestinal calcium transport and a marked action on the mobilization of bone mineral.

The compound identified herein as 24,25-dihydroxycholecalciferol represents the peak V$a$ fraction described in "21,25-Dihydroxycholecalciferol, A Metabolite of Vitamin $D_3$ Preferentially Active in Bone," T. Suda et al., Biochemistry 9, 2917 (1970) and in the above identified application, of which the present application is a continuation-in-part, which peak V$a$ fraction was misidentified as 21,25-dihydroxycholecalciferol.

The physical data recited in the following discussion were obtained as follows: All radioactive determinations were carried out by means of a Packard Tri-Carb Model 3375 liquid scintillation counter equipped with an automatic external standardization system. Samples were evaporated to dryness with a stream of air, dissolved in 4 ml. of toluene counting solution (2 μg. of 2,5-diphenyloxazole and 100 mg. of 1,4-bis-2-(4-methyl-5-phenyloxazolyl)benzene per liter of toluene), and counted.

Ultraviolet spectra were recorded with a Beckman DB-G recording spectrophotometer. Samples in this case were dissolved in ethanol. A molar extinction coefficient of 18,000 was used.

Gas-liquid chromatography was carried out in an F & M Model 402 gas chromatograph manufactured by Hewlett-Packard Co. of Avondale, Pa., using a 4 ft. x 0.25 in. glass column packed with 3% SE-30 on 100–120 mesh Gas Chrom Z (a silicone oil on a ceramic carrier available from Hewlett-Packard Co.). The column temperature was 250° C. and an outlet flow rate of 80 ml./min. was maintained.

Mass spectra were obtained with an MS-9 mass spectrometer, manufactured by Associated Electrical Industries, using direct probe inlet at temperatures of 120–150° C. above ambient.

In Vivo Preparation of Peak V$a$

Eight pigs of mixed breed weighing 230–288 lb. were fed a stock ration to which was added water-dispersible vitamin $D_3$ at a level of 31,000 I.U./lb. of feed (Vitaplus Corp., Madison, Wis.). This supplied 250,000 I.U. of vitamin $D_3$ daily per pig. After 28 days the pigs were slaughtered and their blood was collected. It was immediately mixed with 0.1 volume of 0.1 M sodium oxalate to prevent clotting. Plasma was separated from the cells by means of a De Laval blood separator (De Laval Co.). The 14.1 liters of plasam thus obtained was made 70% saturated with $(NH_4)_2SO_4$ and allowed to stand at 4° for 7 days. The precipitate was collected by centrifugation at 25,000 r.p.m. for 25 min. in a Sharples AS-16-P centrifuge. The protein precipitate (8.4 liters) was extracted with 25.2 liters of methanol-chloroform (2:1) with a portable mixer, Model F (Mixing Equipment Co., Rochester, N.Y.), and allowed to stand for 17 hrs. The protein precipitate was reextracted for 4 hr. with the same volume of methanol-chloroform (2:1) and filtered. To the combined one-phase extracts were added an additional 13.2 liters of chloroform, 4 liters of tap water, and 200 ml. of saturated NaCl. The phases were allowed to stand at 4° for 10 days. The chloroform phase was concentrated to 68 ml. with a rotary flash evaporator. This black oily residue was partitioned with 332 ml. of Skelly B (redistilled petroleum ether, B.P. 67°) and 400 ml. of 90% methanol–10% water in a separatory funnel. As later determined from the radioactive profile obtained by silicic acid column chromatography (Ponchon and De Luca, J. Nutr. 99, 157 (1969)), the upper phase contained less polar metabolites of vitamin $D_3$ (peaks IV–VII). After separation of the phases, 300 ml. of chloroform and 100 ml. of tap water were added to the lower phase. The chloroform phase contained the polar metabolites and was drawn off. The aqueous phase was reextracted with 200 ml. of chloroform. The combined chloroform extracts were then taken to dryness with the flash evaporator and dissolved in 20 ml. of chloroform.

Radiochemically pure [1,2-$^3$H] vitamin $D_3$ (specific activity 90,000 d.p.m./I.U.) was prepared in this laboratory by means of the method of Neville and De Luca Biochemistry 5, 2201 (1966). Chicks were used as a source of radioactive metabolites. Exactly 100 I.U. (2.5 μg.) of [1,2-$^3$H] vitamin $D_3$ was dosed intravenously to each of 51 chickens, which were maintained on a vitamin D deficient diet (Imrie et al., Arch. Biochem. Biophys. 120, 525, 1967) for 27 days. After administration, they were fasted and 20 hrs. later blood was collected by decapitation giving 133 ml. of plasma after centrifugation. This was extracted with methanol-chloroform (2:1), and $^3$H-labeled chicken plasma extract was first applied to a silicic acid column (Ponchon and De Luca, supra) to obtain the $^3$H-labeled peak V. The column was eluted with an ether-Skelly B-methanol gradient, obtained by running 500 ml. of 100% ether from a holding chamber into a 250 ml. constant-volume mixing chamber initially containing 250 ml. of 50% ether in Skelly B. Following the collection of 50 10-ml. fractions, 400 ml. of 5% methanol in ether was placed in the holding chamber, and an additional 40 10-ml. fractions were collected. After that, 400 ml. of 50% methanol in ether was then placed in the holding chamber, and an additional 40 10-ml. fractions were collected.

Peak V was eluted as a single peak, and 1,250,000 d.p.m. of radio activity was recovered as peak V. This radioactive peak V taken from chicken plasma was then mixed with the extract from the hog plasma. The combined extract was then applied in 20 ml. of chloroform to a large 150-g., 60-cm., multibore silicic acid column measuring stepwise in diameter 1.0, 2.0, 3.0, and 4.0 cm. The column was eluted with the ether-Skelly B-methanol gradient as described above for chicken plasma extract except that 1 liter of 100% diethyl ether, 1 liter of 5% methanol in ether, and 1 liter of 50% methanol in ether were added successively to the holding chamber. Again, peak V was eluted as a single peak in the 5% methanol region. Peak V was next rechromatographed on a multibore silicic acid (14 g.) column as described by Neville and De Luca (Biochemistry 5, 2201 (1966)) except that the mixing chamber contained 250 ml. of 50% diethyl ether in Skelly B and the holding chamber contained 500 ml. of 100% diethyl ether. As soon as the holding chamber became empty, it was filled with 300 ml. of 5% methanol in diethyl ether. Fractions (5.5 ml.) were collected. An elution profile indicated that the original peak V had been resolved into at least three components, which were designated V$a$, V$b$, and V$c$. The peak V$a$ collected in tubes 57–84 was then rechromatographed on a Celite partition column, especially designed for this metabolite by methods described by Johnson in Manometric Techniques, Umbreit, Burris and Stauffer, ed. Minneapolis, Minn., Burgess, p. 233–261 (1964) and constructed as follows: 300 ml. of 90% methanol–10% water was equilibrated at 4° with 750 ml. of 80% Skelly B–20% chloroform. The aqueous methanol phase (15 ml.) was mixed with 20 g. of Celite and dry packed into a 60 x 1 cm. column in 2-cm. portions. The upper phase was used as the mobile phase. The column was developed with the mobile phase with 5.5 ml. fractions collected. Tubes 53–64 contained the peak V$a$ metabolite as shown by a radioactive profile on the column. Optical density at 265 m$\mu$ was also measured in each fraction. The mass spectrum of the metabolite indicated the peak V$a$ fraction eluted from the partition column contained a contaminant which had a molecular weight of 426. The contents of tubes 53–64 from the partition column were recombined and then applied in 0.2 ml. of methanol to a 60 x 1 cm. Sephadex LH–20 column (Pharmacia Fine Chemicals Inc., Piscataway, N.J.) which was developed in methanol. Fractions (1 ml.) were collected. The ultraviolet spectrum of the material gave maximum absorption at 265 nm. and minimum absorption at 228 nm. A total of 200 $\mu$g. of the metabolite was isolated.

In Vitro Preparation of Peak V$a$

Chicken (50 one-day-old white Leghorn cockerel chicks obtained from Northern Hatcheries, Beaver Dam, Wis.) were kept in cages at 38° C. and fed ad libitum for 2 weeks as described by Omdahl et al., Biochemistry 10, 2935 (1971). At the end of the second week the chicks were switched to a high calcium diet (3% calcium) and given 0.25 $\mu$g. vitamin D$_3$ orally each day for an additional 12 days. The animals were sacrificed, the kidneys removed and homogenized in 3 volumes of buffer solution containing 14 mM. Tris OAc (trihydroxymethylaminomethane acetate), 0.19 M sucrose, 1.87 mM. MgOAc, 5 mM. succinate and 0.4 mM. NADP (triphosphopyridinenucleotide). A total of 450 ml. of homogenate was obtained and this was incubated as 6 ml. aliquots in 75–250 ml. Erlenmeyer flasks at 37° C. for 90 min. Each flask contained 4.2 $\mu$g. of [26,27-$^3$H] 25-OHD$_3$ (S.A. 57,000 d.p.m./$\mu$g.) in 25 $\mu$l. 95% ethanol. The homogenate was extracted with CHCl$_3$ and MeOH as described by Lund and De Luca, Jour. Lipid Research 7, 739 (1966).

The resulting yellow lipid residue (1 g.) was dissolved in 1.5 ml. of 65:35 CHCl$_3$:Skellysolve B (petroleum ether fraction redistilled at 67–69° C.) and applied to a 2 x 60 cm. glass column packed with 60 g. of Sephadex LH–20 (a hydroxypropyl ether derivative of Sephadex G–25, Pharmacia Corp., Piscataway, N.J.) according to the proedure of Holick and De Luca, Jour. Lipid Res. 12, 460 (1971). Fractions (40–18 ml.) were collected and 20 $\mu$l. of each fraction was used for tritium determinations. The peak V$a$ region (tubes 23–27) was combined and dried under N$_2$ to yield 20 $\mu$g. of the metabolite in 30 mg. of yellow lipid. This residue was dissolved in 50 $\mu$l. of 65:35 CHCl$_3$:Skellysolve B and applied to a 1 x 150 cm. glass column packed with Bio-Beads SX-8 (polystyrene resin produced by Bio-Rad Corp., Richmond, Calif. to a height of 140 cm. in the same solvent according to the procedure of Holick et al., Biochemistry 10, 2799 (1971). Fractions (40–2.0 ml.) were collected and the peak tubes (29–32) were combined, dried under N$_2$ and redissolved in 100 $\mu$l. 1:1 CHCl$_3$:Skellysolve B. The sample was applied to a 1 x 60 cm. glass column packed with 20 g. Sephadex LH–20 and 60–5, 5 ml. fractions were collected. The peak fractions (37–45) were combined, dried under N$_2$ and redissolved in 100 $\mu$l. MeOH. This sample was applied to a 1 x 60 cm. glass column packed with 17 g. Sephadex LH–20 in methanol and 22–1.95 ml. fractions were collected. Fractions 15–18 which contained the metabolite were used for mass spectrometry and ultraviolet absorption spectrophotometry.

CHEMICAL MODIFICATIONS OF THE METABOLITES

Periodate oxidation

The peak V$a$ metabolite (both in vivo and in vitro) (5 $\mu$g.) was dissolved in 30 $\mu$l MeOH and treated with 10 $\mu$l. of a 5% aqueous solution of NaClO$_4$. After 4 hours at 22° 50 $\mu$l of MeOH was added to the reaction mixture and the sample was applied to a 0.8 x 30 cm. glass column containing 5 g. Sephadex LH–20 in MeOH. One ml. fractions were collected and the product was found in fraction 8.

NaBH$_4$ reduction of 25,26,27-trisnor-cholecalcifer-24-al

Three $\mu$g of the periodate cleavage product (from above) was reduced with an excess of NaBH$_4$ in 30 $\mu$l. of MeOH. The reaction mixture was extracted with 0.5 ml. diethyl ether/0.2 ml. H$_2$O (pH-4) and the water phase was reextracted with 0.2 ml. diethyl ether. The ether phases were combined and dried under N$_2$. Part of the sample was used for mass spectrometry and the rest of the sample was dried under N$_2$ and dissolved in 5$\mu$l. of pyridine. To this was added 2 $\mu$l of TBT (a special combination of trimethylsilyl imidazole, bis-trimethylsilyl acetamine, and trimethylchlorosilane, Pierce Chemical Co., Rockford, Ill.) and the reaction was allowed to proceed for 15 min. at 22° C. The reaction mixture was extracted with water/n-hexane and the product in the n-hexane was used for mass spectrometry.

Trimethyl silylation of 24,25-(OH)$_2$D$_3$

One $\mu$g. of the peak V$a$ metabolite was dissolved in 15 $\mu$l. of pyridine and reacted with 7 $\mu$l of TBT at 22° C. for 15 min. The reaction mixture was either used directly for mass spectrometry and gas liquid chromatography or it was purified on a 0.8 x 30 cm. Sephadex LH–20 column developed in MeOH as described above.

Chromium trioxide oxidation of 24,25-(OH$_2$D$_3$

Four $\mu$g. of the peak V$a$ metabolite was dissolved in 20 $\mu$l. of dichloromethane and to this was added 1 $\mu$l. of a 5% solution of CrO$_3$-pyridine complex in dichloromethane (w./v.) (see Collins, Tetrahedron Letters, 30, 3363, 1968) and the reaction was continued for 5 min. Seventy-five $\mu$l of MeOH was added to the reaction and the sample was immediately applied to a 0.8 x 30 cm. MeOH Sephadex LH–20 column as described above.

IDENTIFICATION OF THE IN VITRO PEAK V$a$ METABOLITE AS 25,25-(OH)$_2$D$_3$

The ultraviolet absorption spectrum for the in vitro metabolite showed a $\lambda_{max}$ at 263 nm. and a $\lambda_{min}$ at 228 nm. (nanometers) demonstrating the presence of the 5,6-cis-triene chromophore characteristic for the D vitamins. The mass spectrum of the metabolite showed a molecular ion at m/e 416 suggesting the incorporation of an additional oxygen function into its parent 25-OHD$_3$. A fragment at m/e 271 and 253 (271-H$_2$O) from the metabolite identical with 25 OHD$_3$ requires that the additional oxygen function be in the side chain. The trimethyl silyl ether derivative of the metabolite displayed a molecular ion at m/e 632 demonstrating the presence of 3 hydroxyl functions in the molecule while the strong peak at m/e 131 firmly established the presence of a C-25 hydroxyl function (Blunt et al., Biochemistry 7, 3317, 1968; Suda et al., Biochemistry 9, 2917, 1970).

Upon treatment with periodate, 95% of the tritium in the metabolite on C$_{26}$ and C$_{27}$ could not be accounted for after the sample was evaporated under N$_2$ to dryness. The mass spectrum of the product showed a molecular ion peak at m/e 356 which could only result from the cleavage of the C$_{24}$-C$_{25}$ bond to yield the corresponding 24 aldehyde derivative. Treatment of the metabolite with CrO$_3$-pyridine complex in CH$_2$Cl$_2$ (Collins, supra) gave a mixture of mono and di-ketones. M.W.-414, 412) as well as the cleavage product of M.W.-356. These results require that the additional hydroxyl is vicinal to the C$_{25}$-OH and on C$_{24}$. The structure of the in vitro generated material is 24,25(OH)$_2$D$_3$.

IDENTIFICATION OF THE IN VIVO PEAK V$a$ METABOLITE AS 24,25 - DIHYDROXYCHOLECALCIFEROL 24,25-(OH$_2$D$_3$)

Since it has been reported that the peak V$a$ metabolite generated in vivo from animals on a high calcium diet comigrated on a liquid-liquid partition chromatographic system (Boyle et al., Proc. Nat. Acad. Sci. U.S., 68, 2131 (1971)) with the peak V$a$ material isolated from porcine plasma and previously identified as 21,25-dihydroxycholecalciferol 21,25-(OH)$_2$D$_3$ (Suda et al., Biochemistry 9, 2917, supra), it was of interest to reexamine the structure of the in vivo peak V$a$ metabolite.

The peak V$a$ metabolite isolated from porcine plasma was obtained in pure form. The ultraviolet absorption spectrum showed a λ$_{max}$ at 265 nm. and a λ$_{min}$ at 228 similar to that reported by Suda et al., Biochemistry 9, 2917 supra, and was identical to that reported hereinbefore for the in vitro peak V$a$. The mass spectra of both the porcine peak V$a$ and its tritrimethylsilyl ether derivative were essentially identical to those reported for the proposed 21,25-(OH)$_2$D$_3$ by Suda et al., in Biochemistry 9, 2917, and the GLC trace of the tritrimethylsilyl ether derivative showed the characteristic pyro and isopyro peaks. However, when the metabolite was treated with periodate, the mass spectrum of the resulting product was identical to that obtained for the periodate treated in vitro peak V$a$ showing a molecular ion peak at m/e 356 (resulting from cleavage of C$_{24}$-C$_{25}$ bond) and fragment peaks at m/e 271, 253 (271-H$_2$O), 136 and 118 (136-H$_2$O). NaBH$_4$ reduction of the product yielded the corresponding alcohol with a molecular ion peak at m/e 358 with fragments at m/e 271 and [253](271-H$_2$O) representing a cleavage of C$_{17}$-C$_{20}$ bond (loss of the entire side chain) and m/e 136 and 118 (136-H$_2$O) (representing ring A plus C$_6$, C$_7$ and C$_{19}$). The reduction product forms a ditrimethylsilyl ether (M.W.-502) upon treatment with TBT, suggesting the presence of two hydroxyl functions in the molecule, one of them being in ring A presumably at C$_3$ and the other in the side chain. These results clearly demonstrate that the in vivo porcine peak V$a$ is 24,25 (OH)$_2$D$_3$ and not 21,25-(OH)$_2$D$_3$ as proposed by Suda et al. and in Serial No. 157,020.

BIOLOGICAL ACTIVITY

Antirachitic activity (line test assay)

The line test assay for antirachitic activity of 24,25-dihydroxycholecalciferol was carried out in accordance with the method described in U.S. Pharmacopeia (Mack Publishing Co., Easton, Pa., 1955).

When fed orally 24,25-dihydroxycholecalciferol was found to have an activity of less than 10 I.U./μg. when given intravenously, however, it was found to have an activity of 20 I.U./μg.

Serum calcium (bone mobilization) response and calcium transport

Bone mineral mobilization response to 24,25-dihydroxycholecalciferol intravenously was tested as previously described (Blunt et al., Natl. Acad. Sci. U.S. 61, 1503 (1968)). In addition, intestines were removed from these rats and calcium transport was measured by the everted sac technique as previously described (Blunt et al., supra). The results show that at 12 hr. after administration, 24, 25-dihydroxycholecalciferol was almost but not quite as effective as 25-hydroxycholecalciferol but more effective than vitamina D$_3$ in stimulating the rise in plasma calcium at the expense of bone. However it was less than one-third as active in the stimulation of intestinal calcium transport. Thus the 24,25-dihydroxycholecalciferol (Table I) appears to act preferentially on the bone mobilization system.

TABLE I

Effect of Intrajugular Administration of 2.5 μg. of 24,25-dihydroxycholecalciferol, 25-hydroxycholecalciferol, or Vitamin D$_3$ on Calcium Transport and Serum Calcium of Rats on a Low Calcium Diet

| Group | 12 hr. after Administration [1] | |
|---|---|---|
| | Calcium transport (45Ca) serosal/ (45Ca) mucosal | Bone mobilization serum Ca (mg. percent) |
| Control | 1.5±0.3(5) | 4.4±0.4(5) |
| 24,25-dihydroxycholecalciferol | 2.6±0.8(5) | 6.5±0.2(5) |
| 25-hydroxycholecalciferol | 5.9±1.6(5) | 7.3±0.5(5) |
| Vitamin D$_3$ | | 5.0±0.5(5) |

[1] Plus or minus shows the standard deviation of the mean. Numbers in parentheses show the number of animals in each group.

It is evident from the foregoing that 24,25-dihydroxycholecalciferol preferentially carries out the well-known effect of vitamin D on bone. This indicates that it would be a preferred agent for use as a bone mobilizer or to elevate serum calcium in cases of hypoparathyroidism or other bone diseases.

Having thus described the invention what is claimed is:
1. 24,25-dihydroxycholecalciferol.

References Cited

UNITED STATES PATENTS 3,585,221   6/1971   De Luca     260—397.2
3,565,924   2/1971   De Luca et al.     260—397.2

ELBERT L. ROBERTS, Primary Examiner